United States Patent [19]

Carlson

[11] Patent Number: 4,735,861

[45] Date of Patent: Apr. 5, 1988

[54] COATED GLASS SUBSTRATE

[75] Inventor: Robert L. Carlson, Southgate, Mich.

[73] Assignee: Ford Motor Company, Dearborn, Mich.

[21] Appl. No.: 72,940

[22] Filed: Jul. 13, 1987

[51] Int. Cl.$^4$ .................. C03C 17/25; C03C 17/27
[52] U.S. Cl. ........................... 428/432; 65/60.52; 427/166; 427/168; 427/226; 427/427
[58] Field of Search ............... 65/60.52; 427/168, 226, 427/166, 427; 428/432

[56] References Cited

U.S. PATENT DOCUMENTS

| | | | |
|---|---|---|---|
| 3,850,665 | 11/1974 | Plumat et al. | 65/60.52 X |
| 3,984,591 | 10/1976 | Plumat et al. | 427/168 X |
| 4,120,679 | 10/1978 | Philbert | 65/60.52 |
| 4,129,434 | 12/1978 | Plumat et al. | 65/60.52 |
| 4,239,816 | 12/1980 | Breininger et al. | 427/168 |
| 4,259,371 | 3/1981 | Postupack et al. | 427/226 |
| 4,292,347 | 9/1981 | Donley | 427/168 |
| 4,344,986 | 8/1982 | Henery | 65/60.52 X |

Primary Examiner—Robert L. Lindsay
Attorney, Agent, or Firm—William E. Johnson; Clifford L. Sadler

[57] ABSTRACT

This disclosure teaches a new article of manufacture. The article includes a glass substrate and an adherent coating on the glass substrate of a gray color. The coating on the glass substrate has a composition selected from the group of glass coating compositions consisting essentially of oxides of cobalt, manganese, and copper, wherein the metal content of the metal oxide composition contains 45–60% by weight of cobalt, 26–39% by weight of manganese, and 12–20% by weight of copper. The actual weight percent of each metal is adjusted so that all metals are within their stated ranges when providing a total of 100% by weight metal. The coated glass substrate can be made into a product which has particular utility as a tinted architectural or a tinted automotive glass product.

11 Claims, No Drawings

COATED GLASS SUBSTRATE

TECHNICAL FIELD

This application is directed to a coated glass substrate in which an adherent coating is applied to a glass substrate by a pyrolytic decomposition process. In such a process, a heat decomposable, organic based material containing metals is applied to a surface of a heated glass substrate. When the heat decomposable material is applied to the heated glass substrate, the heat decomposable portion of the material volatilizes leaving an oxide form of the metals as the adherent coating on the glass substrate. The coated glass substrate can be made into a product which has particular utility as a tinted architectural glass product or a tinted automotive glass product.

BACKGROUND ART AND PRIOR ART STATEMENT

It is known in the art to apply a heat decomposable material, for example, a heat decomposable organic based material containing metals, to a surface of a heated glass substrate in order to develop an adherent coating of such metals on the surface of the glass substrate. When the heated decomposable material is applied to the heated glass substrate, the heat decomposable portion of the applied material volatilizes leaving behind on the surface of the glass substrate an adherent oxide form of the metals contained therein.

I have discovered that if the metal composition of the metal oxide coating on the surface of the glass substrate falls within certain percentages of cobalt, manganese and copper, the adherent coating will have a very desirable gray color on a clear glass substrate. By a very desirable gray color, I mean that the coated glass substrate will absorb more light than a prior art, grey coated glass product of which I am aware. By absorbing more light, less light is reflected by the gray coated glass substrate. This greater absorption eliminates a yellow reflection that was obtained with the prior art gray coated glass product, thereby providing the more desirable gray color achieved with the coated glass substrate of my invention. The more desirable gray color of my invention may be utilized both as an architectural glass product and as an automotive glass product. The previous metal oxide coating which I am aware of for producing a gray color on a clear glass substrate had a coating chemistry of approximately 95% cobalt and 5% iron for the metals forming the metal oxide coating.

A prior art study was carried out with respect to the subject matter of this specification in the U.S. Patent and Trademark Office. As a result of that search, the following patents were cited: U.S. Pat. Nos. 3,850,665; 3,984,591; 4,120,679; 4,129,434; 4,239,816; 4,259,371; 4,292,347; and 4,344,986. These patents will be discussed individually below.

U.S. Pat. No. 3,850,665 for a "Process for Forming a Metal Oxide Coating on a Substrate and Resulting Products" issued on Nov. 26, 1974. This patent discloses forming a metal oxide coating on a vitreous or nonvitreous substrate by applying to a substrate a composition comprising an acetyl acetonate coprecipitate of two or more metals. The substrate and composition are simultaneously or subsequently heated to convert the coprecipitate on the substrate to leave a metal oxide coating which is at least partly composed of an oxidic compound of two or more metals. While the patent mentions the metals which will be disclosed below, there is no teaching or suggestion in this patent of the compositional ranges which will be disclosed below, and that these ranges will product a gray color which has the desirable attributes already discussed above which are not found in the gray colored glass disclosed above as being in the prior art.

U.S. Pat. No. 3,984,591 for a "Process for Forming a Metallic Oxide Coating" issued on Oct. 5, 1976. This patent discloses a metallic oxide coating being formed on a substrate which may be vitreous, partly vitreous, or nonvitreous. The coating is developed by applying to the substrate a solution of one or more metallic salts selected from the group of acetates, halides and nitrates in aprotic solvent having a dielectric constant greater than 15 and a dipolar moment greater than 3D. The substrate and applied solution are then subjected to heat to convert in situ the metallic salt to form a coating comprising at least one metallic oxide.

U.S. Pat. No. 4,120,679 for a "Production of Semi-Reflecting Glass Products" issued on Oct. 17, 1978. This patent discloses a process of producing semi-reflecting glass products. The process includes the step of applying to at least a portion of one surface of the product a solution of at least one charge-transfer complex in a nonaqueous organic solvent therefor. The product is heated prior to the application to a temperature sufficient to evaporate the solvent and cause pyrolysis of the charge-transfer complex.

U.S. Pat. No. 4,129,434 for a "Process for Forming a Metal Oxide Coating" issued on Dec. 12, 1978. This patent discloses the formulation of a metal oxide coating on a vitreous or nonvitreous substrate by applying a solution containing at least one metal compound to the substrate and then heating the coated substrate to convert the compound in situ to leave a coating of metal acetyl acetonate or mixture of metal acetyl acetonates in a solvent.

U.S. Pat. No. 4,239,816 for "Organic Additives for Organo Metallic Compositions" issued on Dec. 16, 1980. This patent discloses a coating composition for the pyrolytic decomposition of metal oxide films comprising an organo metallic coating reactant, a high boiling point organic compound which modifies the rate of film formation and decreases the particle size of the metal oxide, and, preferably, a nonflammable halocarbon containing solvent.

U.S. Pats. Nos. 3,984,591; 4,120,679; 4,129,434; and 4,239,816 do not teach or suggest the specific materials that will be disclosed to achieve the very desirable gray color on a glass substrate as is achieved if one follows the teachings of my invention.

U.S. Pat. No. 4,259,371 for a "Method for Improving the Alkali Durability of Metal Oxide Films Formed by Pyrolysis" issued on Mar. 31, 1981. This patent discloses a method for improving the uniformity and durability of a pyrolytically deposited metal oxide film on glass by cooling the coating solution and/or the atomizing air prior to the application of the coating composition to the hot glass. While the patent mentions a number of different materials which may be used in the process, there is no specific teaching or suggestion of the use of the three metals I will propose below in the percentages also to be proposed below to achieve a gray color coating on a glass substrate which has the desirable characteristics which I have described above, namely, that of absorbing more light than previously known compositions thereby eliminating a yellow reflection that was obtained with the previously known gray composition.

U.S. Pat. No. 4,292,347 for a "Pyrolytic Coating Reactant for Defect and Durability Control" issued on Sept. 29, 1981. This patent discloses a mixture of carboxylate and diketonate coating reactants which form a metal oxide film with essentially the same reflectance and transmittance as a metal oxide film formed from diketonate coating reactants alone, while providing improvement in control of defects in the film. Once again, while there are a number of metal coating materials mentioned, there is no disclosure or suggestion of the particular metal coating materials and the concentration of these metal coating materials that I will disclose below for obtaining a very desirable gray color on a glass substrate.

U.S. Pat. No. 4,344,986 for a "Method of Delivering Powder Coating Reactants" issued on Aug. 17, 1982. The patent discloses a method for depositing a coating from a turbulant, gaseous stream of a powder coating reactant delivered to a substrate surface through a slot shaped nozzle. The patent does not teach or suggest the particular coating metal oxides and concentrations therein of metals which I will set out below for obtaining a very desirable gray color on a glass substrate.

BRIEF DESCRIPTION OF THE DISCLOSURE

This invention is directed to a new article of manufacture and, more particularly, to a new article of manufacture which is a glass substrate having a gray color coating on a surface thereof. Products manufactured from the glass substrate find particular utility as tinted architectural glass products or tinted automotive glass products. The gray color on the products so-produced is very desirable because the coated glass product will absorb more light than previously known products. By absorbing more light, less light is reflected by the glass product thereby eliminating an undesirable yellow reflection that was obtained with previously known products. Since the product of my invention eliminates the yellow reflection known in previous products, the gray color of my product is more uniform and soft.

In accordance with the teachings of my invention, a glass substrate having a gray color coating on a surface thereof which forms the new article of my invention has the following construction. The new article includes a glass substrate which has a selected surface. An adherent coating is on the selected surface of the glass substrate. The coating consists essentially of oxides of cobalt, manganese, and copper wherein the metal content of the oxide coating contains 45-60% by weight cobalt, 26-39% by weight manganese, and 12-20% by weight copper; the actual weight percentage of each metal being adjusted so that all metals are within their stated ranges when providing a total of 100% by weight metal.

When this coating is placed on a clear glass substrate, as explained above, a very desirable gray color is achieved because the yellow reflection known in the disclosed prior product is eliminated. This results in a gray color which is uniform and soft in appearance.

In accordance with further teachings of embodiments of my invention, the coating can have a thickness in a range of 20-120 nanometers (nm). Also, in accordance with the still further teachings of additional embodiments of my invention, the coating may be placed on what are called "body colored glass substrates" in which the glass substrate itself has a color throughout its entire extent such as green, blue, bronze, gray, or other colors known in the art.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific embodiments.

The following description is what I consider to be a preferred embodiment of the new article of manufacture of my invention. The following description also sets forth what I now contemplate to be the best mode of making the article of manufacture. The description, however, is not intended to be a limitation upon the broader principles of this invention.

I am aware, as has been described in the Background and Prior Art Statement portion of this specification, of a prior art glass product which includes a glass substrate and a coating on the substrate which is gray in color. The glass substrate is formed from glass produced in the float glass process of glass manufacturing. A gray color coating is applied to the substrate. Generally, this coating is applied to the float glass in a pyrolytic operation by spraying the hot glass as it emerges from a float glass manufacturing process with a heat decomposable spray material.

In accordance with the teachings of the prior art, the hot glass is sprayed with a solution of cobalt and iron acetyl acetonates, in a suitable solvent, which results in an oxide film being formed on the glass having metallic content of approximately 95% cobalt and 5% iron. Normally, the thickness of the film so-generated is in a range of 60-65 nm. In such a case, when this coating is applied to a glass sheet having a thickness of 0.125 inch, the glass will have an overall transmittance of approximately 21.1% and a film side reflectance of 38.0%, which means that the coated glass sheet absorbs 40.9% of the light striking it. Because of the relatively high reflectance of 38.0%, the prior known coated glass sheet exhibits a yellow irridescent reflectance which detracts from the overall color of the glass. When one views the glass with the coating on the surface of the glass sheet away from the eye, the glass will appear gray in color but will have a definite yellowish cast thereto which upsets the color uniformity and is displeasing to the eye because the soft gray color is disturbed.

The coated glass substrate of my invention has an adherent, gray color coating on a selected surface thereof. In the presently preferred embodiment, the coating on the surface of the glass substrate is formed from oxide forms of cobalt, manganese, and copper in specific proportions. The coating composition is one wherein the metal content of the coating metal oxides contain 45-60% by weight cobalt, 26-39% by weight manganese, and 12-20% by weight copper. The actual weight percent of each metal is adjusted so that all the metals forming the oxide coating composition are within their stated range when providing a total of 100% by weight metal in the metal oxide coating composition.

EXAMPLE

The purpose of this example is to disclose a preferred method of making as a new article of manufacture the coated glass substrate of my invention. The best mode, as presently known to me, of making my new article of manufacture is a pyrolytic application of a heat decomposable material which will result in the formation of an adherent, multimetal oxide containing coating on a glass substrate. Such operations are carried out by formulating a solution of dissolved metals in a solvent therefor which will volatilize in the presence of heat and oxygen thereby permitting the metals to react with oxygen, in the presence of heat and the glass substrate to develop a multimetal oxide coating adherent to the glass substrate. Generally, the solution to be sprayed is kept at a temperature below the volatilization temperature of the solvent, and the glass sheet is heated to a temperature sufficiently high to cause the volatilization of the solvent and any other volatile materials dissolved therein in the vicinity of and/or on the surface of the glass substrate. The glass substrate temperature is normally in the range of 1000°–1200° F., preferably 1100° F.

In accordance with the teachings of the best mode of producing the new article of manufacture of my invention, the article is developed in the following manner. A piece of ⅛ inch thick clear float glass is heated to a temperature of approximately 1100° F. The glass sheet, in its heated condition, has a solution sprayed thereon from a conventional hand-held paint spray gun. The spray solution contains 10% by weight of a mixture of metal acetyl acetonates dissolved in 90% by weight methylene chloride. In accordance with the teachings of a preferred embodiment of this invention, the mixture of metal acetyl acetonates dissolved in the methylene chloride contain 43.5% cobalt acetyl acetonate, 43.5% manganic acetyl acetonate, and 13% cupric acetyl acetonate by weight.

The solution spraying operation takes place with a spacing between the spray gun and the heated glass sheet of approximately 12 inches and the time of spray, which can be from 5 to 10 seconds, of approximately 10 seconds. Due to the temperature of the glass and the oxygen ambient in which the spraying takes place, the organic portion of the sprayed solution breaks down and is oxidized and the metals are also oxidized. Part of the metal oxides so-developed become adhered to the surface of the glass substrate to form a film thereon. The process is not highly efficient in that for every ten grams of metal sprayed, approximately ten percent of the sprayed metal actually winds up in the adherent metal oxide film, with the remainder being exhausted in an exhaust gas stream.

In accordance with the teachings of this preferred embodiment, the film formed by the practice of this example has a film thickness of approximately 60 nm and the oxide coating composition has a metal content of 49% cobalt, 34% manganese, and 17% copper. The coated glass substrate has a transmission of 20.9% and a film side reflectance of 27.3%, substantially below the 38.0% reported for the prior art clear glass substrate having a gray coating composition thereon formed of 95% cobalt and 5% iron as the metal content of the coating.

In my new product, the light absorption is 51.7%, substantially above the 40.9% reported for the prior art product. What all this means is that in reflected light, in my new product there is no occurrence of a yellowish cast as my new coating absorbs so much additional light. With my new product, one obtains a very uniform gray coating on the glass substrate, the gray coating having no undesirable yellowish shades in reflected light. This glass product gives in reflected light a very uniform gray color which is soft in nature.

As stated above, the metal content of the oxidized metal coating on the glass substrate should contain 45–60% by weight cobalt, 26–39% by weight manganese, and 12–20% by weight copper. The actual weight percentages of each metal is adjusted so that all metals are within their stated ranges when providing a total of 100% by weight metal. By this I mean that, for example, if one selected an oxidized metal coating which has 60% by weight cobalt, that coating must have at least 12% by weight copper contained therein. Thus, the manganese would have to be present in an amount of at least 28% by weight. However, if one desired to have 60% by weight cobalt and 26% by weight manganese, then one would have 14% by weight copper. Thus, as stated above, the actual weight percent of each element is adjusted so that all elements are within the stated range, but when added together provide a total of 100% by weight of metal.

Slight changes in the composition effect slight shifts in the tint of the gray which is more perceptible in thinner films. When thicker films are used, the changes in composition have a smaller effect on the color viewed. The remarkable thing about this gray color is that it is truly a gray, when placed on a clear glass substrate, and does not have a yellowish hue or cast in reflected color as did the prior art product described.

With respect to thickness of coating applied, coatings may be applied to any thickess from about 20 nm to 120 nm or more, preferably 30–85 nm. At 45 nm, on ⅛ inch thick gray body colored architectural glass, the visible transmittance would be 30%, whereas at 75 nm, the visible transmittance would be about 9.4%. In order to get the thicker coatings, it may be necessary to use multiple guns to apply the coating, or have the glass reheated for two or more applications of the coating material.

A change in composition of the metal content of the oxidized metal coating can be carried out by making slight changes in the materials applied. For example, if more cobalt is desired, the cobalt content of the material applied may be increased, as is understood by those skilled in the art. Changes in the surface composition, of course, result in slight changes to the gray color and slight changes in the transmittance of light therethrough. It is within the skill of an artisan to adjust the surface composition of the oxidized metal coating in order to achieve the shade of gray desired or the transmittance characteristics desired.

It is also understood that the glass substrate may be a clear glass substrate or it may be a body colored glass substrate. A body colored glass substrate is one which has color in the glass substrate itself. Normal colored glass substrates include, but are not limited to, green, blue, bronze, and gray. When body colored glass substrate compositions are colored in accordance with the teachings of my invention, the film developed thereon is a gray film, even on the various colors of glass.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention. For example, the composition set forth in the claims may be developed by the application of a powder spray or a vapor spray, or by other known means available to those skilled in the art for applying a coating to a glass substrate.

I claim:

1. As a new article of manufacture:

a glass substrate having a selected surface; and an adherent coating on said selected surface of said glass substrate, said coating being a coating having a composition selected from the group of glass coating compositions consisting essentially of oxides of cobalt, manganese, and copper wherein the metal content of the oxide coating composition contains 45–60% by weight cobalt, 26–39% by weight manganese, and 12–20% by weight copper; the actual weight percent of each metal being adjusted so that all metals are within their stated ranges when providing the total of 100% by weight metal.

2. The new article of manufacture of claim 1, wherein said adherent coating is gray in color.

3. The new article of manufacture of claim 2, wherein said adherent coating has a thickness in a range of 20–120 nm.

4. The new article of manufacture of claim 2, wherein said metal content of said oxide coating composition is 49% cobalt, 34% manganese, and 17% copper by weight.

5. The new article of manufacture of claim 2, wherein said glass substrate is clear glass.

6. The new article of manufacture of claim 2, wherein said glass substrate is a body colored glass substrate.

7. The new article of manufacture of claim 1, wherein said glass coating is gray in color and has a thickness in a range of 30 nm to 85 nm.

8. A new article of manufacture comprising:

a glass substrate having a selected surface and an adherent coating on said selected surface;

said coating consisting essentially of oxides of cobalt, manganese, and copper wherein the metal content of said coating contains 45% to 60% by weight cobalt, 26% to 39% by weight manganese, and 12% to 20% by weight copper.

9. A new article of manufacture comprising:

a glass substrate having a selected surface and an adherent coating on said selected surface;

said coating consisting essentially of oxides of cobalt, manganese, and copper wherein the metal content of said coating contains 45% to 60% by weight cobalt, 26% to 39% by weight manganese, and 12% to 20% by weight copper;

said coating having a thickness in a range of 20 nm to 120 nm, said coating being grey in color.

10. The new article of manufacture of claim 9, wherein said coating has a thickness in a range of 30 nm to 85 nm.

11. A new article of manufacture made be the process comprising:

heating a glass substrate to a temperature in the range of 1000° F. to 1200° F.;

spraying a solution from a spraying device onto said glass substrate;

said solution containing approximately 10% by weight of a mixture of metal acetyl acetonates dissolved in approximately 90% by weight methylene chloride;

said metal acetyl acetonates comprising approximately 43% by weight cobalt acetyl acetonate, 43% by weight manganic acetyl acetonate, and the remainder cupric acetyl acetonate;

said spraying device being spaced from said glass approximately 12 inches;

said spraying occuring for a period of 5 to 10 seconds;

whereby the heat of the glass substrate causes the organic portion of the sprayed solution to break down and oxidize and deposit on said glass substrate as an adherent coating having a thickness in the range of 30 nm to 85 nm and being charactererized by its gray color.

* * * * *